United States Patent [19]

Ryan

[11] Patent Number: 5,130,810
[45] Date of Patent: Jul. 14, 1992

[54] METHOD AND APPARATUS FOR PROCESSING A VIDEO SIGNAL SO AS TO PROHIBIT THE MAKING OF ACCEPTABLE VIDEOTAPE RECORDINGS

[75] Inventor: John O. Ryan, Cuppertino, Calif.
[73] Assignee: Macrovision Corporation, Mountain View, Calif.
[21] Appl. No.: 935,055
[22] Filed: Nov. 21, 1986

Related U.S. Application Data

[63] Continuation of Ser. No. 554,697, Nov. 23, 1983.
[51] Int. Cl.⁵ .......................................... H04N 7/167
[52] U.S. Cl. ................................... 358/310; 358/335; 380/10; 380/5; 360/37.1
[58] Field of Search ................. 358/319, 310, 335, 171, 358/160, 148, 19; 360/37.1, 60, 15, 33.1; 380/5, 15, 22

[56] References Cited

U.S. PATENT DOCUMENTS

| | | | |
|---|---|---|---|
| 2,890,276 | 6/1959 | Luther | 358/160 |
| 3,439,113 | 4/1969 | Walker | 380/15 |
| 3,460,161 | 8/1969 | Waller et al. | 380/15 |
| 3,517,127 | 6/1970 | Grace | 358/148 |
| 3,530,232 | 9/1970 | Reiter et al. | 380/15 |
| 3,614,308 | 10/1971 | Iwai | 360/34.1 |
| 4,030,128 | 6/1977 | Perret | 360/33.1 |
| 4,100,575 | 7/1978 | Morio | 358/120 |
| 4,121,242 | 10/1978 | Janko | 360/37.1 |
| 4,163,253 | 7/1979 | Morio | 360/37.1 |
| 4,213,149 | 7/1980 | Janko | 360/60 |
| 4,286,281 | 8/1981 | Suzuki | 360/19.1 |
| 4,390,898 | 6/1983 | Bond | 358/119 |
| 4,439,785 | 3/1984 | Leonard | 358/335 |
| 4,454,544 | 6/1984 | Abbott | 358/120 |
| 4,463,376 | 7/1984 | Osaka | 358/120 |
| 4,475,129 | 10/1984 | Ragota | 358/335 |
| 4,488,183 | 12/1984 | Kinjo | 358/319 |
| 4,571,642 | 2/1986 | Hofstein | 360/37.1 |
| 4,577,216 | 3/1986 | Ryan | 360/37.1 |
| 4,631,603 | 12/1986 | Ryan | 360/37.1 |
| 4,695,901 | 9/1987 | Ryan | 380/5 |

FOREIGN PATENT DOCUMENTS

| | | | |
|---|---|---|---|
| 78819 | 7/1978 | Japan | 360/37.1 |
| 89715 | 8/1978 | Japan | 358/335 |
| 123289 | 7/1983 | Japan | 358/319 |
| 2042846 | 9/1980 | United Kingdom | 358/335 |

OTHER PUBLICATIONS

Testimony of James G. Fifield, President & CEO, The CBS/Fox Company, on unauthorized back-to-back copying of copyrighted prerecorded videocassettes and videodiscs before the Senate Judiciary Committee Sep. 23, 1986, 10 pages.
Showtime Video Ventures Video Stabilizer spec sheet ©1982.
Video magazine, Jun., 1981, pp. 88, 90.
High Fidelity monthly, Dec. 1982, p. 54.
Television Engineering Handbook ©1969, by D. G. Fink, pp. 19-10 to 19-12.

Primary Examiner—Robert L. Richardson
Attorney, Agent, or Firm—Skjerven, Morrill, MacPherson, Franklin & Friel

[57] ABSTRACT

A video signal is modified so that a television receiver still produces a normal color picture from the modified signal, whereas a videotape recording of this signal produces generally unacceptable pictures. This invention relies on the fact that videotape recorders feature some form of automatic level control circuit. These automatic level control circuits measure the sync pulse level in the video signal and develop a gain correction signal for keeping the video level applied to an FM modulator in the videotape recording system at a fixed predetermined value. In accordance with the present invention either a positive or a negative pulse is added to the video signal immediately following the trailing edge of sync. The effect of these added pulses is to cause the automatic level control circuit in the recorder to assess the video level at either many times its actual value or as a fraction of its actual value. The gain correction signal applied to the amplifier in the automatic level control circuit thus causes recording of a signal which is either not strong enough to properly synchronize a television receiver's scanning circuits or is so high to result in clipping and sync distortion. The sync pulses themselves can also be at a reduced level, and means are disclosed for boosting the black level in the video signal so as to not degrade normal reproduction of the video signal on a television receiver.

15 Claims, 3 Drawing Sheets

METHOD AND APPARATUS FOR PROCESSING A VIDEO SIGNAL SO AS TO PROHIBIT THE MAKING OF ACCEPTABLE VIDEOTAPE RECORDINGS

This is a continuation of application Ser. No. 554,697, filed Nov. 23, 1983, which was abandoned upon the filing hereof.

BACKGROUND OF THE INVENTION

This invention pertains to a method and apparatus for modifying a video signal so that a television receiver produces a normal color picture from the modified signal, whereas a videotape recording of the modified signal produces generally unacceptable pictures.

There exists a need for a method and system for modifying a video signal so that the signal produces a normal color picture on a television receiver, but videotape recording of the video signal is inhibited or prevented. In a copending application by the present inventor and assigned to the assignee of the present invention, entitled METHOD AND APPARATUS FOR PROCESSING A VIDEO SIGNAL, and filed in the United States Patent, and Trademark Office on Nov. 14, 1983, Ser. No. 551,696, now U.S. Pat. No. 4,577,216, there is described one way of modifying a video signal so as to inhibit videotape recording thereof. In that copending application, the color burst component of a video signal is phase modulated, which causes a videotape recorder to interpret the phase variation as a velocity error and alter the chrominance signal, giving rise to color noise in the videotape recording. In accordance with the present invention, it has been discovered that there are other ways to inhibit videotape recording of a video signal, by modifying the video signal.

Video cassette recorders designed for the consumer market place invariably feature some form of automatic level control (ALC). The ALC circuit insures that the video level applied to the FM modulator in the recording system remains at a fixed, predetermined value, even if the video level applied to the machine's input terminal varies widely about the nominal value. Without an ALC system, high level signals would be distorted and clipped and low level signals would be marred by the noise and interference products generated by the recording process. If the input level dropped to less than ⅓ of normal value, the replayed signal might not even be strong enough to reliably synchronize the receiver's timebases, hence giving rise to noisy unstable pictures.

OBJECTS AND SUMMARY OF THE INVENTION

It is an object of this invention to provide a method and apparatus for modifying a color video signal so that a conventional television receiver produces a normal color picture from the modified signal, whereas a videotape recording made from the modified signal is rendered unacceptable.

It is a more specific object of this invention to provide such a method and apparatus in which a pulse is inserted in the video signal following the trailing edge of the sync pulse during the blanking interval, whereby the added pulse causes an automatic level control circuit in a videotape recorder to erroneously sense video signal level and produce a gain correction that results in an unacceptable videotape recording.

Briefly, in accordance with one embodiment of the invention, a pulse is inserted in the video signal immediately following the trailing edge of the sync pulse. This pulse which is inserted can be either a positive pulse or a negative pulse. If the pulse is a positive pulse, an automatic level control circuit in a videotape recorder senses a sync pulse level greater than the actual value and produces a gain correction to reduce the recorded level of the video signal to an unacceptable level. If the inserted pulse is a negative pulse, an automatic level control circuit in a videotape recorder senses a sync pulse level lower than its actual value, and produces a gain correction to increase the recorded level of the video signal to an unacceptable level.

Other objects and advantages of the present invention will appear from the detailed description taken in conjunction with the accompanying drawings.

DETAILED DESCRIPTION OF THE PREFERRED EMBODIMENTS

It has been discovered that by modifying certain characteristics of a video signal, the automatic level control circuits in a videotape recorder can be forced to behave as if the video signal was either much larger than it actually is or much lower than it actually is. The result is that the signal is in the first instance recorded on the tape at such a low level that on replay, the receiver produces noisy unstable pictures. Alternatively, the signal is recorded on the tape at such a high level that on replay clipped and distorted signals result.

Figure 1:
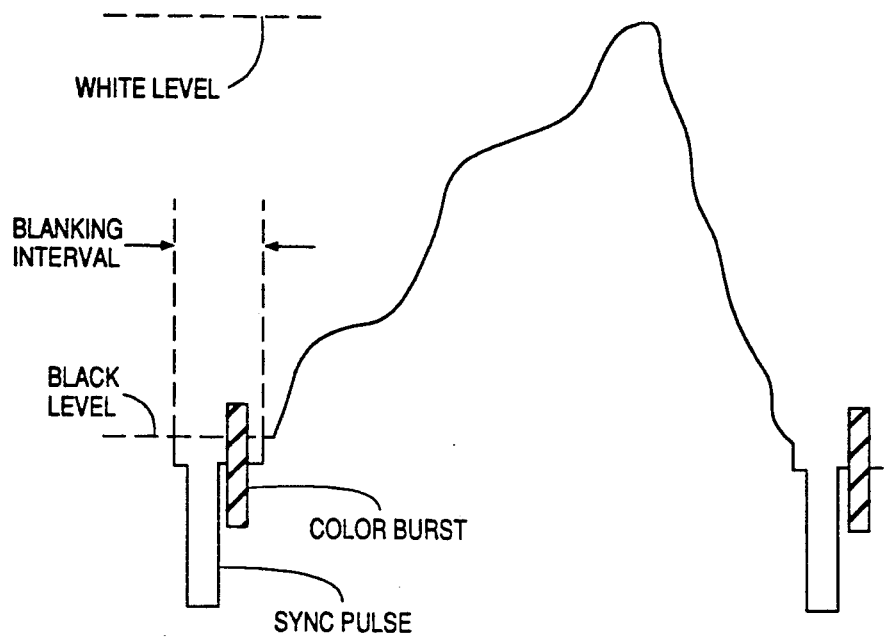
FIG. 1 is an illustration of the waveform of a typical video signal.

Turning now to FIG. 1, the waveform of a typical video signal is illustrated. The only features of this waveform which remain constant despite changes in picture content are those which occur during the blanking intervals, notably the sync pulses and the color burst. Because the level of the color burst is highly dependent upon tuner response, the level of the sync pulse (any of the pulses which go from blanking level to a synch tip level, including equalizing pulses and vertical synch pulses) is almost always used as the reference level in automatic level control systems in videotape recorders.

Figure 2:
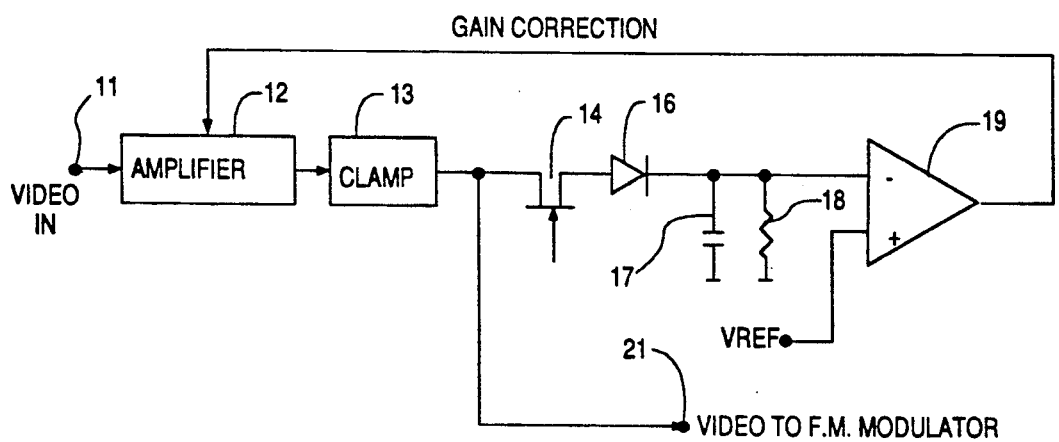
FIG. 2 is a block diagram of a typical automatic level control circuit in a videotape recorder.

Referring now to FIG. 2, a typical automatic level control system as utilized in videotape recorders is illustrated. In the typical system illustrated in FIG. 2, a video in signal at a terminal 11 passes through an amplifier 12 and to a sync-tip clamp or DC restorer circuit 13, which establishes the sync tip voltage at some value $V_1$. A sampling circuit consisting of a transistor switch 14 and a positive peak detector including diode 16, capacitor 17, and resistor 18 measures the voltage of the video signal just after the trailing edge of the sync pulse to yield a voltage $V_2$. The difference voltage ($V_2 - V_1$) is a measure of the sync pulse level. A differential amplifier 19 compares this sync pulse level voltage $V_2-V_1$ with a reference voltage $V_{ref}$, and generates at its output an error or gain correction signal which is coupled back to the amplifier 12. This negative feed-back arrangement insures that the signal level of the video signal applied to an FM modulator input at terminal 21 remains constant at the signal level value chosen by the designer of the circuit.

Figure 3:
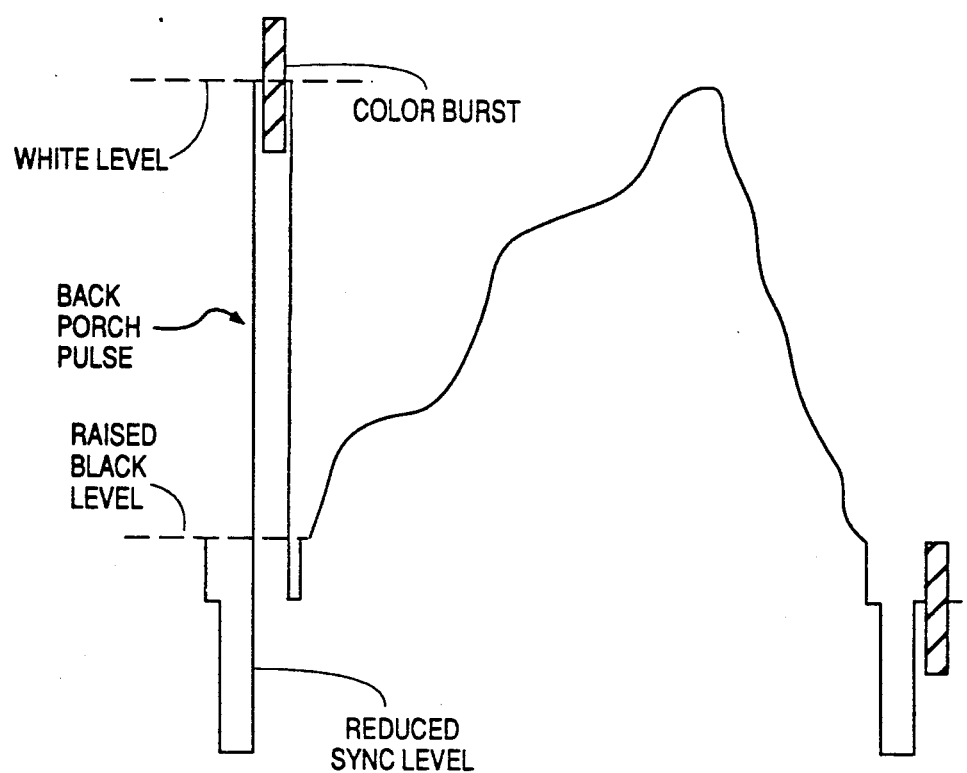
FIG. 3 illustrates the waveform of a video signal as modified in accordance with one embodiment of the invention.

Turning now to a consideration of FIG. 3, there is illustrated a waveform of a video signal modified in accordance with one embodiment of the present invention. Referring to FIG. 3, it can be seen that a positive pulse has been added to the video signal immediately following the trailing edge of sync. For maximum effect, the amplitude of this pulse should be such as to raise the back porch voltage to the level of peak white as shown in FIG. 3. The effect of this positive pulse is to cause the automatic level control circuit in a videotape recorder to assess the sync pulse level in the video signal at about three and one-half times its actual value. The feedback action of the automatic level control circuit as discussed in connection with FIG. 2 will then reduce the signal at the FM modulator input to about 30% of the correct value in the ideal case. The replayed signal as recorded on the videotape recorder will, therefore, be well below normal level and have a poor signal/noise ratio. In many cases the signal will not be strong enough to properly synchronize the receivers' scanning circuits.

Some videotape recorders have automatic level control systems which really do not have sufficient feedback control range to reduce a video signal to the extent discussed above. Therefore, if desired, as an additional feature of this embodiment of the present method and apparatus, a reduced sync pulse level as illustrated in FIG. 3 can also be utilized which will further aggravate the receivers' synchronizing systems. The ratio of sync level to total video level in a standard signal is large enough to insure that scan synchronization is maintained even when the received signal is otherwise too weak to produce an acceptable picture. This ratio can be reduced considerably, up to about 2:1 before scan synchronization becomes unreliable, provided this signal level is reasonably normal.

In some television receivers the black level is stabilized by clamping the back porch of the video signal to a reference voltage. Since in accordance with the embodiment of this invention being described the back porch voltage is raised considerably, the effect of the modified video signal on such a television receiver would be a depression of the black level. This would require the brightness control of the television receiver to be turned up by an amount which might be beyond the receiver's capabilities. In accordance with a further aspect of the present invention, this problem can be alleviated.

First, the back porch pulse as illustrated in FIG. 3 can be added to the video signal only on every fifth line of the signal. This would, for example reduce the brightness reduction due to the averaging action of black level clamps. Since the automatic level control systems in videotape recorders use peak detectors with decay times of many line-periods, this occasional added positive back porch pulse will still have the desired effect on the video level, and will lead to unacceptable videotape recordings. Furthermore, the specific automatic level control decay time-constant used varies between various models of videotape recorders. By selecting the repetition rate of the back porch pulse as illustrated in FIG. 3, the method of the present invention can be used to affect only those videotape recorders which use the longer time-constants. It is important, however, that the pulse pattern chosen remains the same from frame to frame within the video signal so as to minimize its visibility in the reproduction of the signal on a television receiver.

In accordance with another aspect of the present embodiment of this invention, the black level of the video signal can be raised while holding the white level constant. Thus, the effect of receiver black level depression due to the back porch pulse as illustrated in FIG. 3 can be reduced. The black level can be raised by as much as 20% without detriment to picture quality. Techniques for raising the black level are well known in the art. The mark-space ratio of the back porch pulse as illustrated in FIG. 3, the amount of sync-level reduction and the degree of black lift are all variables which may be optimized for specific applications of the present invention.

Figure 4:
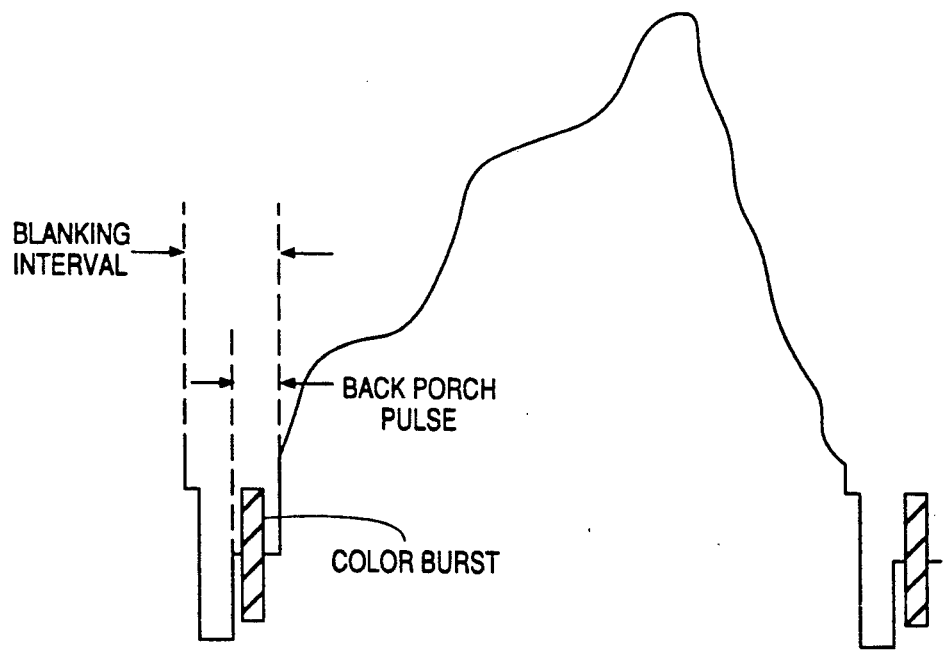
FIG. 4 illustrates a video waveform as modified in accordance with an alternate embodiment of the present invention.

Turning now to a consideration of FIG. 4, there is shown a waveform of a video signal modified in accordance with an alternative embodiment of the present invention. Specifically, in the waveform as illustrated in FIG. 4, a negative pulse is added to the video signal on all lines during the back porch interval. If, for example, this pulse is set at half the amplitude of the sync pulses, the videotape recorder's automatic level control system will assess that the video signal is at 50% of normal level, and will cause the gain correction signal as applied to the amplifier (see FIG. 2) to be doubled. The brighter areas of the picture will, therefore, be clipped in the recording system, giving the picture a washed-out appearance. This effectively inhibits videotape recording of the modified video signal. Also in connection with this embodiment, the sync level of this signal can be reduced as described in connection with the previous embodiment of the invention.

Figure 5:
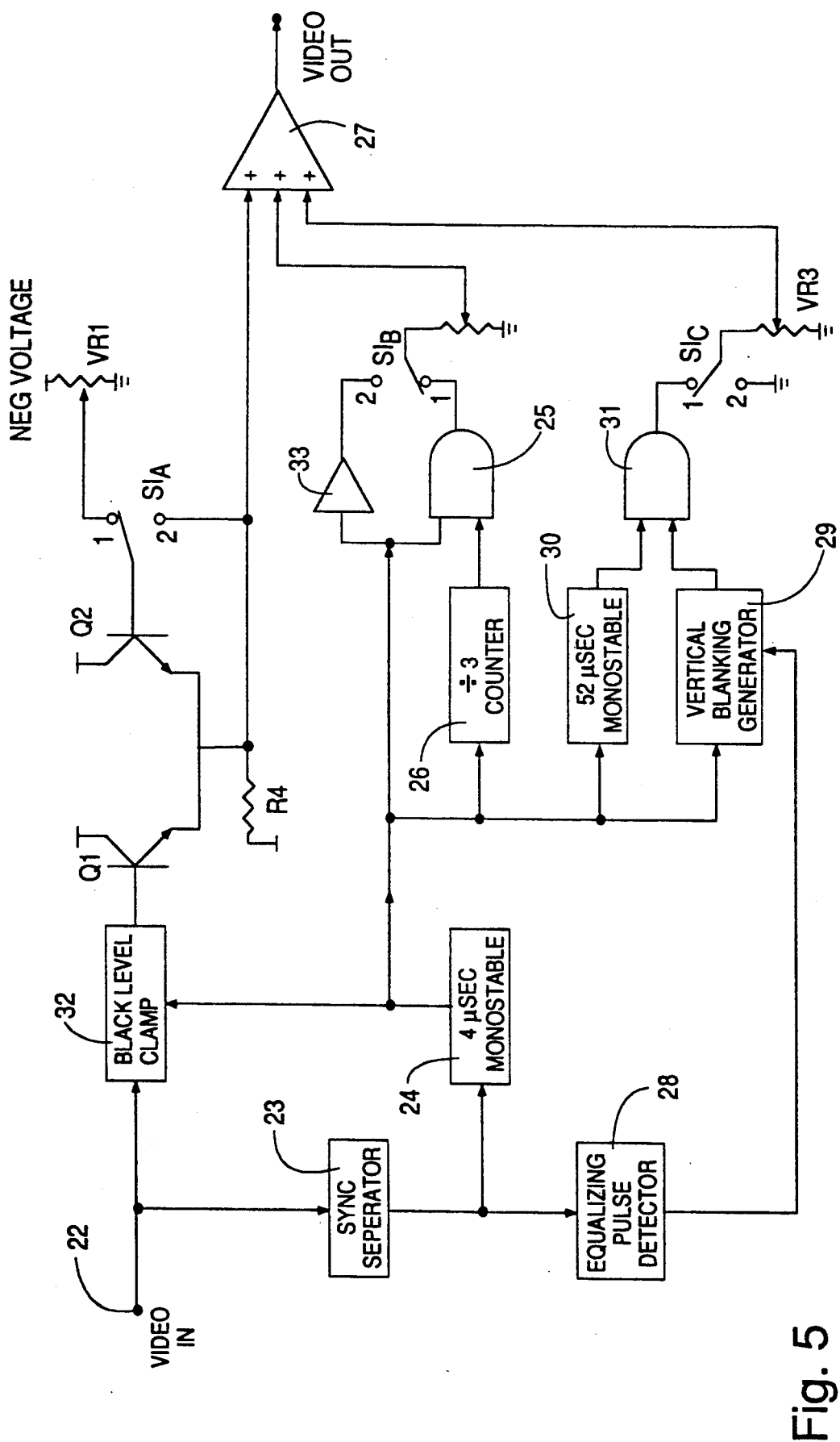
FIG. 5 is a block diagram of typical circuitry for modifying the video signal waveforms as shown in the waveforms of FIGS. 3 and 4.

Turning now to FIG. 5, there is shown a block diagram of typical apparatus which can be utilized to practice the method of the present invention as described above in connection with FIGS. 3 and 4. It should be understood that many different kinds of circuit arrangements are possible to produce the modified signals as shown in FIGS. 3 and 4, and the embodiment described in connection with the block diagram of FIG. 5 is exemplary only. Referring to FIG. 5, a three pole switch S1, provides a means for selecting either the first method of the present invention in which a positive pulse is added to the video signal or the second method of the present invention in which a negative pulse is added to the video signal. As illustrated in FIG. 5, the three pole switch S1 is set to position one thereof for inserting a positive pulse into the video signal as illustrated in connection with FIG. 3.

Incoming video signals at a terminal 22 are applied to a synchronizing-pulse-separator 23, which generates composite sync pulses at its output. The trailing edges of these pulses trigger a monostable multivibrator 24, which generates four microsecond-long, positive-going pulses during the back porch interval. These pulses are applied to the AND gate 25 along with a gating pulse from a divide-by-3 counter 26. This gating pulse is high for one line period out of three, and consequently the AND gate 25 generates a back porch pulse only on every third line of the picture. Of course, if desired, the circuitry can be modified to generate a back porch pulse on every fourth, fifth, or any other portion of the lines of the picture. In general terms, the circuitry provides a pulse on every Nth line, where N is an integer greater than one. The pulse output of the AND gate 25 is applied to a potentiometer VR2, which has its output connected to one input of a summing amplifier 27. Thus, the potentiometer VR2 controls the level of the back porch pulse added to the video signal.

The sync pulses from the sync separator 23 are also applied to an equalizing pulse detector 28 which generates a field rate pulse which occurs just after the first equalizing pulse of the vertical interval. This pulse is used to reset a counter in a vertical blanking generator 29 which counts the pulses from the four microsecond monostable 24. The output of the vertical blanking generator 25 is a negative pulse which lasts for the duration of vertical blanking, i.e. twenty lines. This is accomplished by gating circuits within the vertical blanking generator 29 which detect the next twenty nine counter states after the reset pulse. That is, there are twenty nine mixed synchronizing pulses during the vertical blanking interval and each one triggers the monostable 24.

The pulses from monostable 24 trigger a 52 microsecond monostable 30 whose output is a positive pulse corresponding to the active portion of the line. This pulse is applied to an AND gate 31 along with inhibit pulses from the vertical blanking generator 29. The output of the AND gate 31 is, therefore, a composite blanking signal and is applied to a potentiometer VR3 which has its output connected to another input of the summing amplifier 27. Thus, potentiometer VR3 controls the amount of black level lift applied to the video signal in accordance with one aspect of the present invention.

The incoming video signal at terminal 22 is applied to a black level clamp 32 which is driven by pulses from the four microsecond monostable 24. The video at the output of the black level clamp 32 will be at zero volts (for example) during the back porch interval. Transistors $Q_1$ and $Q_2$ and resistor $R_4$ comprise a common negative-peak clipping circuit with the clipping level determined by the voltage on the base of transistor $Q_2$. The base of $Q_2$ is connected to the slider of a potentiometer VR1, the top of which is connected to a negative voltage equal to the sync level on the base of transistor $Q_1$. The potentiometer VR1, therefore, controls the amount of sync level reduction in accordance with that aspect of the present invention.

The block diagram of FIG. 5 also illustrates circuitry useful for practicing the alternate embodiment of the present invention, in which the negative pulse is inserted into the video signal. For this mode of operation, the three pole switch S1 is switched to position 2. In this position 2, the pole S1a of the switch S1 ties the base and emitter of transistor $Q_2$ together, thus inhibiting the sync clipping action. The pole S1c of switch S1 connects the top of potentiometer VR3 to ground, thus eliminating the black level lift. The pole S1b of switch S1 connects the top of potentiometer VR2 to the output of an inverter 33. Thus, the output of the inverter 8 allows the addition of negative pulses to the video signal during the back porch interval on every line of the video signal.

Thus what has been described is a method along with exemplary apparatus for modifying a video signal so that a television receiver produces a normal color picture from the modified signal, whereas a videotape recording of this signal produces generally unacceptable pictures. Many different forms of apparatus and circuits are possible for practicing the method of this invention, and the particular circuitry illustrated in FIG. 5 is by way of example only. Various modifications to the arrangement of FIG. 5 are possible without departing from the true spirit and scope of the present invention.

What is claimed is:

1. A method for processing a video signal so as to inhibit the making of acceptable videotape recordings therefrom while producing a normal picture on a television receiver wherein the video signal has a blanking interval which includes a sync pulse followed by a back porch voltage interval, comprising the step of adding a pulse only on regularly spaced Nth lines, where N is an integer greater than 1, in the video signal immediately following the trailing edge of the sync pulse, whereby the added pulse causes an automatic level control circuit in a videotape recorder to sense an erroneous indication of video signal level and produce a gain correction that results in an unacceptable videotape recording;

wherein the step of adding a pulse only on regularly spaced Nth lines comprises adding a position pulse to the video signal during the back porch interval, said method further including raising the black level of the video signal while holding the white level constant to thereby reduce black level depression in a television receiver, whereby an automatic level control circuit in a videotape recorder senses a sync pulse level greater than its actual value and produces a gain correction to reduce the recording level of the video signal to an unacceptable level.

2. A method in accordance with claim 1 wherein the black level of the video signal is raised by an amount not exceeding 20%.

3. A method for processing a video signal so as to inhibit the making of acceptable videotape recordings therefrom while producing a normal picture on a television receiver wherein the video signal has a blanking interval which includes a sync pulse followed by a back porch voltage interval, comprising the step of adding a pulse only on regularly spaced Nth lines, where N is an integer greater than 1, in the video signal immediately following the trailing edge of the sync pulse, whereby the added pulse causes an automatic level control circuit in a videotape recorder to sense an erroneous indication of video signal level and produce a gain correction that results in an unacceptable videotape recording; including the further step of reducing the level of the sync pulse.

4. A method in accordance with claim 3 wherein the step of adding a pulse only on regularly spaced Nth lines comprises adding a positive pulse on every third line.

5. A method for processing a video signal so as to inhibit the making of acceptable videotape recordings therefrom while producing a normal picture on a television receiver wherein the video signal has a blanking interval which includes a sync pulse followed by a back porch voltage interval, comprising adding a negative pulse to the video signal during the back porch interval, whereby an automatic level control circuit in a videotape recorder senses a sync pulse level lower than its actual value and produces a gain correction to increase the recorded level of the video signal to an unacceptable level.

6. A method in accordance with claim 5 including the additional step of reducing the level of the sync pulse.

7. A method in accordance with claim 5 wherein the video signal is a color signal having a color burst signal in the blanking interval, said step of adding a negative pulse including adding the pulse over a period of time including the period of time during which the color burst signal occurs.

8. Apparatus for processing a video signal to inhibit the making of acceptable videotape recordings therefrom while the signal still can be used to produce a normal color picture on a television receiver wherein the video signal has a blanking interval which includes a sync pulse followed by a back porch interval, comprising means for adding a pulse only on regularly spaced Nth lines, where N is an integer greater than one, in the video signal immediately following the trailing edge of the sync pulse, whereby the added pulse causes an automatic level control circuit in a videotape recorder to sense an erroneous indication of video signal level and produce a gain correction that results in an unacceptable videotape recording;
   wherein said means for adding a pulse on regularly spaced Nth lines in the video signal comprises means for adding a positive pulse to the video signal during the back porch interval, and means for raising the black level of the video signal while holding the white level constant to thereby reduce black level depression in a television receiver, whereby an automatic level control circuit in a videotape recorder sense a sync pulse level greater than its actual value and produces a gain correction to reduce the recorded level of the video signal to an unacceptable level.

9. Apparatus in accordance with claim 8 wherein said means for adding a pulse on regularly spaced Nth lines comprises means for adding such a pulse on every third line.

10. Apparatus for processing a video signal to inhibit the making of acceptable videotape recordings therefrom while the signal still can be used to produce a normal picture on a television receiver, wherein the video signal has a blanking interval which includes a sync pulse followed by a back porch interval, comprising means for adding a negative pulse to the video signal during the back porch interval, whereby an automatic level control circuit on a videotape recorder senses a sync pulse level lower than its actual value and produces a gain correction to increase the recorded level of the video signal to an unacceptable level.

11. Apparatus in accordance with claim 10 wherein the video signal is a color signal and includes a color burst signal occurring during the back porch interval, said means for adding a negative pulse adds the negative pulse over a period of time including the period of time during which the color burst signal occurs.

12. Apparatus in accordance with claim 10 which further includes means for reducing the level of the sync pulse tip relative to the black level.

13. Apparatus for processing a video signal to inhibit the making of acceptable videotape recordings therefrom while the signal still can be used to produce a normal color picture on a television receiver wherein the video signal has a blanking interval which includes a sync pulse followed by a back porch interval, comprising means for adding a pulse only on regularly spaced Nth lines, where N is an integer greater than one, in the video signal immediately following the trailing edge of the sync pulse, whereby the added pulse causes an automatic level control circuit in a videotape recorded to sense an erroneous indication of video signal level and produce a gain correction that results in an unacceptable videotape recording;
   wherein the video signal is a color signal including a color burst signal occurring during the back porch interval, said means for adding a pulse adds the pulse over a period of time including the period of time during which the color burst signal occurs.

14. Apparatus for processing a video signal to inhibit the making of acceptable videotape recordings therefrom while the signal still can be used to produce a normal color picture on a television receiver wherein the video signal has a blanking interval which includes a sync pulse followed by a back porch interval, comprising means for adding a pulse only on regularly spaced Nth lines, where N is an integer greater than one, in the video signal immediately following the trailing edge of the sync pulse, whereby the added pulse causes an automatic level control circuit in a videotape recorder to sense an erroneous indication of video signal level and produce a gain correction that results in an unacceptable videotape recording; and
   including means for reducing the level of the sync pulse tip relative to the black level.

15. A method for processing a video signal so as to inhibit the making of acceptable videotape recordings therefrom while producing a normal picture on a television receiver wherein the video signal has a blanking interval which includes a sync pulse followed by a back porch voltage interval, comprising the step of adding a pulse only on regularly spaced Nth lines, where N is integer greater than 1, in the video signal immediately following the trailing edge of the sync pulse, whereby the added pulse causes an automatic level control circuit in a videotape recorder to sense an erroneous indication of video signal level and produce a gain correction that results in an unacceptable videotape recording;
   wherein the video signal is a color signal having a color burst signal in the blanking interval, said step of adding a pulse includes adding the pulse over a period of time including the period of time during which the color burst signal occurs.

* * * * *